United States Patent
Biles et al.

(10) Patent No.: US 7,318,143 B2
(45) Date of Patent: Jan. 8, 2008

(54) REUSEABLE CONFIGURATION DATA

(75) Inventors: Stuart D. Biles, Cambridge (GB); Krisztian Flautner, Cambridge (GB); Scott Mahlke, Ann Arbor, MI (US); Nathan Clark, Ann Arbor, MI (US)

(73) Assignees: ARM Limited, Cambridge (GB); University of Michigan, Ann Arbor, MI (US)

( * ) Notice: Subject to any disclaimer, the term of this patent is extended or adjusted under 35 U.S.C. 154(b) by 215 days.

(21) Appl. No.: 11/044,734

(22) Filed: Jan. 28, 2005

(65) Prior Publication Data
US 2006/0095720 A1 May 4, 2006

Related U.S. Application Data

(60) Provisional application No. 60/619,949, filed on Oct. 20, 2004.

(51) Int. Cl.
*G06F 15/80* (2006.01)
(52) U.S. Cl. .......................................... 712/10; 712/15
(58) Field of Classification Search ................ 712/10, 712/13, 15, 216
See application file for complete search history.

(56) References Cited

U.S. PATENT DOCUMENTS

| | | | | |
|---|---|---|---|---|
| 4,809,159 A | * | 2/1989 | Sowa .......................... | 712/25 |
| 5,159,665 A | | 10/1992 | Priem et al. | |
| 5,249,274 A | * | 9/1993 | Sztipanovits et al. ........ | 712/201 |
| 5,519,841 A | * | 5/1996 | Sager et al. ................. | 711/202 |
| 5,685,005 A | * | 11/1997 | Garde et al. .................. | 712/36 |
| 5,752,035 A | | 5/1998 | Trimberger | |
| 5,784,602 A | * | 7/1998 | Glass et al. .................. | 712/220 |
| 5,881,263 A | * | 3/1999 | York et al. ................... | 712/217 |
| 6,029,239 A | * | 2/2000 | Brown .......................... | 712/1 |
| 6,073,233 A | * | 6/2000 | Chapman ..................... | 713/1 |
| 6,085,314 A | | 7/2000 | Asghar et al. | |
| 6,209,077 B1 | * | 3/2001 | Robertson et al. ............ | 712/17 |
| 6,209,078 B1 | | 3/2001 | Chiang et al. | |
| 6,397,240 B1 | * | 5/2002 | Fernando et al. ........... | 708/603 |
| 6,438,679 B1 | | 8/2002 | Sollars | |
| 6,507,947 B1 | * | 1/2003 | Schreiber et al. ........... | 717/160 |
| 6,577,316 B2 | | 6/2003 | Brethour et al. | |
| 6,708,325 B2 | | 3/2004 | Cooke et al. | |
| 6,762,761 B2 | | 7/2004 | Devins et al. | |
| 6,959,376 B1 | * | 10/2005 | Boike et al. .................. | 712/35 |
| 6,961,841 B2 | * | 11/2005 | Huppenthal et al. .......... | 712/34 |
| 2002/0066083 A1 | | 5/2002 | Patel et al. | |
| 2003/0140222 A1 | | 7/2003 | Ohmi et al. | |
| 2003/0167348 A1 | | 9/2003 | Greenblat | |

* cited by examiner

*Primary Examiner*—Eric Coleman
(74) *Attorney, Agent, or Firm*—Nixon & Vanderhye P.C.

(57) ABSTRACT

An information processor for executing a program comprising a plurality of separate program instructions is provided. The processor comprises processing logic operable to individually execute said separate program instructions of said program, an operand store operable to store operand values and an accelerator having a plurality of functional units. The accelerator executes a combined operation corresponding to a computational sub-graph of the separate program instructions by configuring individual ones of said plurality of functional units to perform particular processing operations associated with the combined operation. The accelerator executes the combined operation in dependence upon operand mapping data providing a mapping between operands of the combined operation and storage locations within said operand store and in dependence upon separately specified configuration data providing a mapping between the plurality of functional units and the particular processing operations. The configuration data can be re-used for different operand mappings.

25 Claims, 18 Drawing Sheets

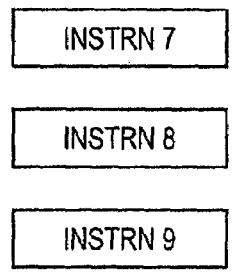
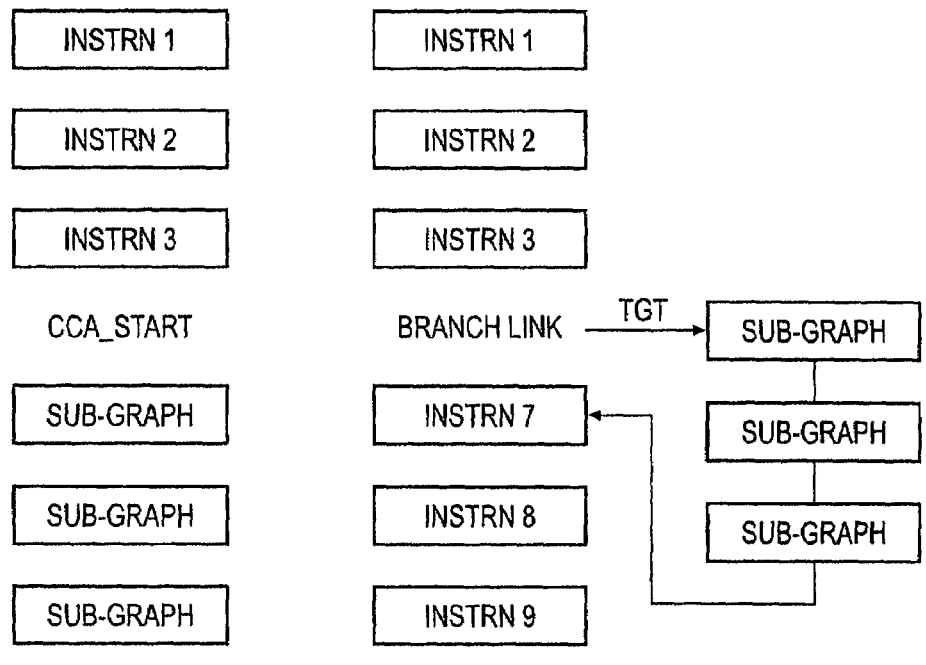
Fig. 6A
Fig. 6B

SEQUENCE 1

ADD r2, r1, r0

AND r2, r2, r3     CCA3, {r0, r1, r3, r4} {r5}

SUB r5, r2, r4

Fig. 7A

SEQUENCE 2

ADD r4, r7, r9

AND r4, r4, r5     CCA3, {r9, r7, r5, r10} {r4}

SUB r4, r4, r10

Fig. 7B

ADD   r5, r6, r7

SPILL r7, ⌊___⌋

SUB   r7, r5, r6

FILL  ⌊_⌋ ,r7

ADD   r5, r7, r6

Fig. 9

⋮
I1
I2
CCA_Start
I3
I4
I5
CCA_Stop
I6
I7
⋮

```
...
I1
I2
CCA_len#3
I3
I4
I5
I6
I7
...
```

⋮
I1
I2
I3'
I4'
I5'
I6
I7
⋮

REUSEABLE CONFIGURATION DATA

This application claims the priority and benefit of United States Provisional patent application 60/619,949, filed Oct. 20, 2004, which is incorporated herein by reference in its entirety.

BACKGROUND OF THE INVENTION

1. Field of the Invention

This invention relates to the field of data processing systems. More particularly, this invention relates to data processing systems including an accelerator capable of accelerated execution of some subgraphs within a program.

2. Description of the Prior Art

Known methods of providing enhanced performance in processors include the use of application-specific integrated circuits (ASICs) to perform computationally demanding tasks. ASICs provide performance improvement by offering a customised hardware solution for a particular application. The drawbacks of this approach are that a program application must be re-written to take advantage of the ASIC and this represents a large engineering burden. Furthermore, since this is a hardwired solution only a few program applications will be able to benefit from the functionality of any given ASIC.

A further known method of providing enhanced performance in processors is to use instruction set customisation. According to this approach, computational subgraphs that are critical to program performance can be accelerated by collapsing them into new instructions that are executed on specialised function units. Collapsing subgraphs simultaneously reduces the length of computation as well as the number of intermediate results stored in a register file. Although this approach is more flexible than the use of ASICs since a degree of programability is retained, implementation of new instruction sets requires new sets of masks to be created for processor chip fabrication and the chips must be re-verified with regard to both functionality and timing. Furthermore, instruction set extensions designed for one domain are often not useful in another domain due to the diversity of computation and this causes the extension to have only limited applicability.

There is a need for a system chip to enhance the performance of processors that is more flexible than the use of ASICs and instruction set extensions yet does not represent an undue engineering burden with regard to re-designing and verifying the associated hardware.

SUMMARY OF THE INVENTION

Viewed from one aspect the present invention provides an information processor for executing a program comprising a plurality of separate program instructions:

processing logic operable to individually execute said separate program instructions of said program;

an operand store operable to store operand values; and an accelerator having an array comprising a plurality of functional units, said accelerator being operable to execute a combined operation corresponding to a computational subgraph of said separate program instructions by configuring individual ones of said plurality of functional units to perform particular processing operations associated with one or more processing stages of said combined operation;

wherein said accelerator executes said combined operation in dependence upon operand mapping data providing a mapping between operands of said combined operation and storage locations within said operand store and in dependence upon separately specified configuration data providing a mapping between said plurality of functional units and said particular processing operations such that said configuration data can be re-used for different operand mappings.

The present technique makes use of an accelerator having a plurality of functional units to accelerate common computational subgraphs by executing them as combined operations. The technique recognises that a wide range of program applications can be executed by customising an accelerator having a plurality of functional units. This customisation is performed by configuring individual ones of the functional units of the accelerator to perform particular processing operations associated with one or more processing stages of commonly executed computational subgraphs. The efficiency and reconfigurability of the system is further enhanced by separately specifying operand mapping data and configuration data. The operand mapping data provides mapping between operands of the combined operation representing a commonly executed computational subgraph and storage locations within an operand store of the information processor. The configuration data provides a mapping between the functional units of the accelerator and particularly processing operations corresponding to the computational subgraphs. By separately specifying the operand mapping data and the configuration data in this way it is possible to reuse the configuration data for a range of different operand mappings.

The operand data could be stored in any type of memory. In one embodiment the operand store is a register file (bank) and the storage locations of the operand mapping data that provides mapping between the operands of the combined operation are register locations. In another embodiment the operand store is an operand stack, as used in object-oriented programming languages such as Java, and the storage locations of the operand mapping data are operand stack locations.

It will be appreciated that the subgraph identification information used to identify the computational subgraphs of the program to be executed could be stored separately from the executable program itself, for example in memory of the information processor. However, in an embodiment of the invention the subgraph identification information is included in the program. This provides for easy identification of the computational subgraphs to be accelerated by the accelerator array.

The subgraph identification information could take a variety of different forms, such as a flag within the executable program instructions. In one embodiment of the invention the computational subgraph identification information comprises a marker instruction. The marker instruction could take the form of a subgraph start marker instruction preceding the computational subgraph to be accelerated and/or a subgraph end marker instruction succeeding the subgraph and marking the ends of the portion of code to be accelerated. The marker instruction could alternatively comprise a single instruction including an indication of the length of the succeeding subgraph thereby identifying the end of the subgraph as well as the start of the subgraph. The use of a special-purpose marker instruction to identify the subgraphs provides for easy identification by the accelerator of the subgraphs to be accelerated. Furthermore, the use of these marker instructions allows for binary forward compatibility, meaning that as long as future generations of accelerators support at least the same functionality of the accelerator that the executable code was compiled for, the subgraphs marked in the executable (binary) code are still useful.

The configuration data that provides the mapping between the functional units of the accelerator and the particular processing operations to be accelerated could be generated at a number of different stages in the computation. In one embodiment of the invention at least a portion of the configuration data is generated statically, prior to execution of the program. Static generation of the configuration data can be much more complex and involved than processing performance limitations permit when generating the configuration data dynamically during execution of the program. Accordingly the static generation of the configuration data affords the opportunity to find more computational subgraphs and thus to more accurately identify those subgraphs suitable for acceleration.

In another embodiment of the invention, the configuration data is generated dynamically at runtime of the computer program. For example, the dynamic generation of the configuration data may use a trace cache to generate the data and the subgraphs could be identified on a retiring instruction stream that will become a trace. Thus, when instructions are later fetched from the trace cache the subgraphs will be delineated in those instructions. The dynamic generation of configuration data allows the use of the accelerator to be completely transparent to the instruction set architecture. To reduce the latency that could potentially be associated with dynamic generation of the configuration data a portion of the configuration data could be generated statically whilst a further portion of the configuration data could be generated dynamically at runtime. This allows a certain number of computational subgraphs to be predesigned in the executable code and, for example, saved into a translation table when the program application loads for execution.

In one embodiment of the invention the marker instruction that serves to identify the computational subgraphs is a branch link instruction. The branch link instruction can then be used to direct the information processor to the code corresponding to the computational subgraph to be accelerated. Thus, the computational subgraph code to be accelerated can be clearly delineated from the program code in which the separate program instructions are to be individually executed. Indeed, the branch link instruction of one embodiment has a field for specifying a target address enabling a separate program instruction corresponding to the computational subgraph to be executed by the accelerator to be called as a subroutine.

It will be appreciated that the accelerator could retrieve the operand mapping data from a known location in memory or the operand mapping data could be incorporated in the executable program instructions themselves. However, according to an embodiment of the invention the marker instruction that identifies the computational subgraphs to be executed by the accelerator comprises a field for specifying a pointer to the operand mapping data. This provides an efficient means by which to correlate the operand mapping data with the configuration data and with the computational subgraph code to be accelerated. In another embodiment of the invention, the marker instruction has at least one field for inline specification of the operand mapping data. This provides for transparency of the instructions to be accelerated. In yet a further embodiment the marker instruction has a field for specifying a pointer to the configuration data. This is particularly useful where the configuration data has been statically generated and provides an efficient means by which to retrieve the configuration data associated with the particular computational subgraph to be accelerated.

In one embodiment of the invention the information processor comprises a memory operable to store the configuration data and the accelerator is operable to access the configuration data from the memory. For example, the memory could be random access memory (RAM). Thus, this configuration data can be readily retrieved during execution of the program code. Although the accelerator could use a complete set of configuration data in order to accelerate each computational subgraph, in one embodiment of the invention the information processor is operable to reconstruct the configuration data corresponding to a particular computational subgraph from both the configuration data for a different computational subgraph and from configuration difference data that specifies differences between configuration data for different subgraphs under the configuration for the particular computational subgraph. Storing differences between subgraphs rather than complete configurations allows for more efficient use of previously generated subgraph configuration data and reduces the bandwidth required for communication of configuration data.

Although the present invention is applicable to any type of information processor, in one embodiment the information processor comprises an instruction pipeline. Applying the invention in the pipelined information processor enables the replacement of separate program instructions by a combined instruction for accelerated execution to be performed during certain stages of the pipeline such as, for example, the retirement stage of the pipeline or the decode stage of the pipeline. In another embodiment the information processor is pipelined but accelerator is non-pipelined. This makes integration of the accelerator with the processor more straightforward since it avoids the complexity of having to introduce latches in the matrix of functional units comprising the accelerator and avoids having to forward intermediate results from internal portions of the matrix of functional units of the accelerator.

It will be appreciated that the configuration data could be generated at a number of different points including a number of different stages of the instruction pipeline. However, in one embodiment of the invention the configuration data is generated at a decode stage of the instruction pipeline. Since many microprocessor architectures, such as a the Intel Pentium IV already perform complicated program translations during the decode stage of the instruction pipeline, subgraph replacement is a natural extension of such translation processes. Generation of the configuration data at the decode instruction pipeline stage means that the use of a trace cache is not strictly required when dynamic configuration data generation is used in combination with static configuration data generation. The avoidance of the requirement for the trace cache makes the use of accelerators more attractive in the field of embedded processors where trace caches are considered to be too inefficient and power hungry for widespread use. In another embodiment of the invention the configuration data is generated in dependence upon information derived from a trace cache. In this arrangement, the retiring instruction stream can be used to perform the identification of computational subgraphs for acceleration. This arrangement facilitates identification of candidate subgraphs for acceleration.

In yet a further embodiment of the invention, the information processor is operable to read the configuration data from memory and to configure the accelerator between a decode pipeline stage and an execute pipeline stage.

Although the separate program instructions to be accelerated could be any type of computer program instruction, according to one embodiment of the invention the separate program instructions are reduced instruction set computer instructions (RISC) and the combined operation representing the computational subgraph to be accelerated is a complex instruction set computer (CISC) instruction. Thus, rather than replacing CISC instructions with simpler and more readily executable RISC instructions, this embodiment implements a strategy that runs counter to the prejudice in the field to accelerate execution by replacing RISC instructions with CISC instructions for execution by the reconfigurable accelerator.

It will be appreciated that the operand mapping data could specify data storage locations corresponding to all of the operands involved in calculation of the computational subgraph to be accelerated. However, in one embodiment the operand mapping data specifies only data storage locations corresponding to input operands and to output operands for the computational subgraph and excludes data storage locations corresponding to intermediate results of the combined operation of the subgraph. This reduces the amount of operand mapping data that is required and recognises that intermediate result values, although they correspond to register values within the computation subgraph being accelerated, do not in practice actually need to be written to or read from the registers or stack.

Viewed from another aspect the present invention provides a method of processing information under the control of a computer program comprising a plurality of separate program instructions, said method comprising:

individually executing said separate program instructions of said program using processing logic;

storing operand values in an operand store;

executing a combined operation corresponding to a computational subgraph of said separate program instructions using an accelerator having an array comprising a plurality of functional units by configuring individual ones of said plurality of functional units to perform particular processing operations associated with one or more processing stages of said combined operation; and executing said combined operation on said accelerator in dependence upon operand mapping data providing a mapping between operands of said combined operation and storage locations within said operand store and in dependence upon separately specified configuration data providing a mapping between said plurality of functional units and said particular processing operations such that said configuration data can be re-used for different operand mappings.

A complementary aspect of the invention provides a computer program on a carrier medium operable to compile a source code sequence comprising a plurality of separate program instructions of a computer program to form executable program instructions, said computer program comprising:

analysis code for analysing said source code and translating said source code into a stream of executable program instructions capable of execution by processing logic within a data processing apparatus;

identifying code for identifying canditate computational subgraphs within said stream of executable program instructions;

subset selection code for selecting a subset of said canditate computational subgraphs for accelerated execution as respective combined operations on an accelerator having an array comprising a plurality of functional units, individual ones of said functional units being configurable to perform particular processing operations associated with one or more stages of said combined operations, said accelerator being operable to execute said combined operations in dependence upon operand mapping data providing a mapping between operands of said combined operation and storage locations within said operand store and in dependence upon separately specified configuration data; and configuration data generating code for generating said configuration data providing a mapping between said plurality of functional units and said particular processing operations such that said configuration data can be re-used for different operand mappings.

This complementary aspect of the invention relates to a compiler modified to analyse the computer program to identify computational subgraphs that could be selected for acceleration by the accelerator. The compiler is operable to generate configuration data providing mapping between the plurality of functional units of the accelerator and particular processing operations such that configuration data can be reused for different operand mappings corresponding to different computational subgraphs.

As will be appreciated, compilers already identify subgraphs as part of the way in which they normally perform their compilation operations and it is particularly convenient to modify and extend this subgraph identification to encompass identification of computational subgraphs that could be accelerated and by execution by the accelerator unit and also to incorporate generation of configuration data used to configure the accelerator in a manner appropriate for execution of the selected computational subgraphs.

The above, and other objects, features and advantages of this invention will be apparent from the following detailed description of illustrative embodiments which is to be read in connection with the accompanying drawings.

BRIEF DESCRIPTION OF THE DRAWINGS

FIG. 6A schematically illustrates a first way of indicating to the accelerator which portions of the program code are to be accelerated;

FIG. 6B shows a further way of indicating to the accelerator which portions of the program code are to be accelerated;

FIGS. 7A and 7B together schematically illustrate how configuration data can be reused for two different subgraphs;

FIG. 9 schematically illustrates instructions that are used to promote compatibility with data processors not having an accelerator;

DESCRIPTION OF THE PREFERRED EMBODIMENTS

Figure 1:
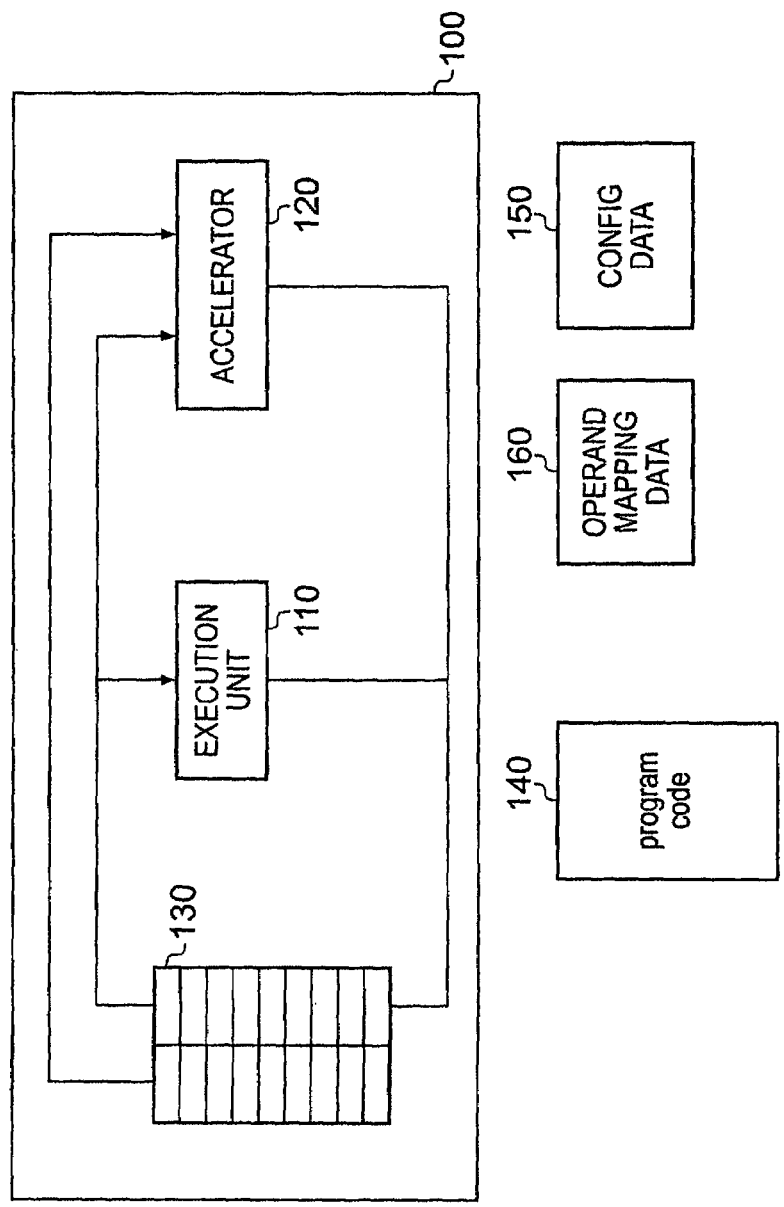
FIG. 1 schematically illustrates an information processor having an acceleration unit.

FIG. 1 schematically illustrates an information processor according to the present technique. The system comprises a processor core 100 having an execution unit 110, an accelerator 120 and a register bank 130. The processor core is operable to execute program code 140, a portion of which is executed using the execution unit 110 and another portion of which is executed using the accelerator 120 in dependence upon a set of configuration data 150 and set of operand mapping data 160. The accelerator 150 is connected in parallel to both the execution unit 110 and the register bank 130.

The accelerator 120 comprises an array of functional units that are configurable in dependence upon characteristics of the particular portion of program code to be executed by the accelerator 120. The accelerator 120 is configured in dependence upon the configuration data 150 to execute a series of separate program instructions corresponding to a particular computational subgraph of the computer program as a combined operation such that processing operations associated with one or more stages of the combined operation are mapped to one or more functional units of the accelerator. The operand mapping data 160 is used to specify a mapping between input and output operands for operations executed on the functional units of the accelerator and locations in the register bank 130 and is used together with the configuration data to define the computations to be performed by the accelerator 120.

The execution unit 110 is operable to individually execute separate instructions of the program code 140, whereas the accelerator 120 is operable to accelerate execution of, for example, certain frequently executed and/or system-critical computational subgraphs representing a portion of the program code 140 by combining the separate program instructions of those computational subgraphs to form combined operations. The configuration data 150 configures the accelerator 120 in a manner that is tuned to the particular computational subgraphs to be executed by it. The program code of the computational subgraphs selected for acceleration is sufficiently self-contained such that the variables associated with the computational subgraph do not propagate elsewhere in the program code 140. The execution unit 100 is an ALU execution unit as may typically be found in a RISC data processor, whereas the accelerator 120 executes combined operations.

Figure 2:
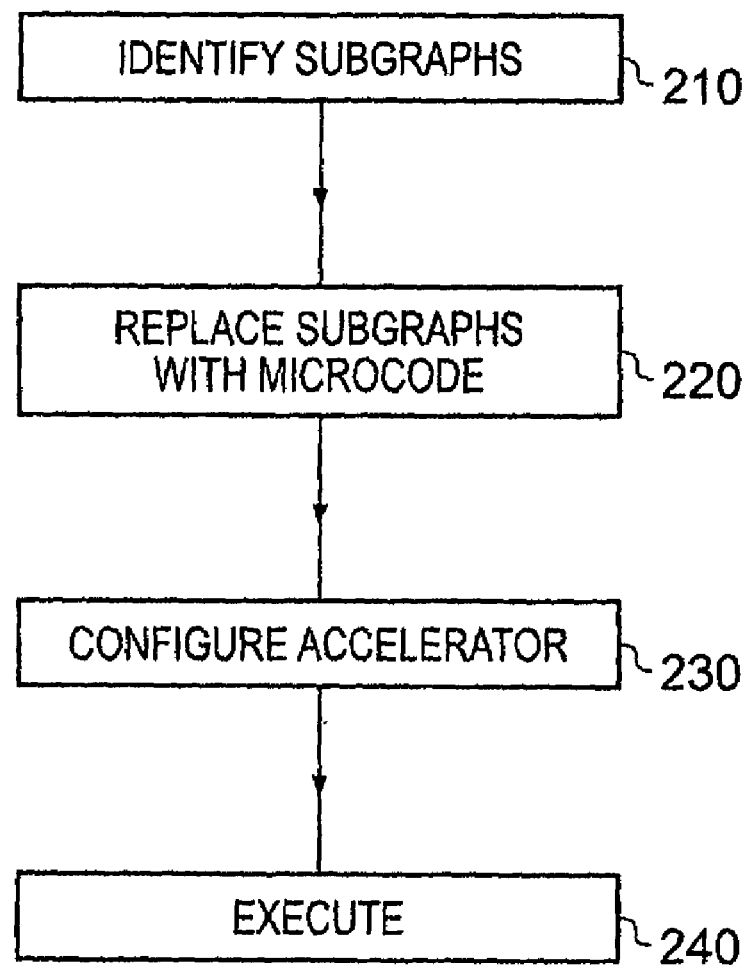
FIG. 2 is a flow chart that schematically illustrates the states involved in the dynamic configuration of the accelerator.

FIG. 2 is a flow chart that schematically illustrates stages involved in dynamic configuration of the accelerator according to one example embodiment. The process begins at stage 210 with identification of the computational subgraphs within the program code 140 and proceeds to stage 220 where the identified computational subgraphs are replaced within a trace cache by microcode and subsequently proceeds to stage 230 where the accelerator 120 is configured in a manner tuned to execute selected ones of the subgraphs that were identified at stage 210. Finally, at stage 240 the subgraph code is executed by the accelerator 240.

The identification of subgraphs at stage 210 can be performed in at least two alternative ways. Firstly, the subgraphs may be identified statically by a compiler during a compilation stage of the program code 140, which involves generation of machine instructions (executable code) from the program code 140. Secondly, the subgraphs may be identified dynamically at runtime by hardware and/or software in the processor core 100. In this particular arrangement, subgraph identification is performed dynamically using information from a retiring instruction stream corresponding to trace data, this data being read by the subgraph identification hardware from a trace cache.

Figure 3:
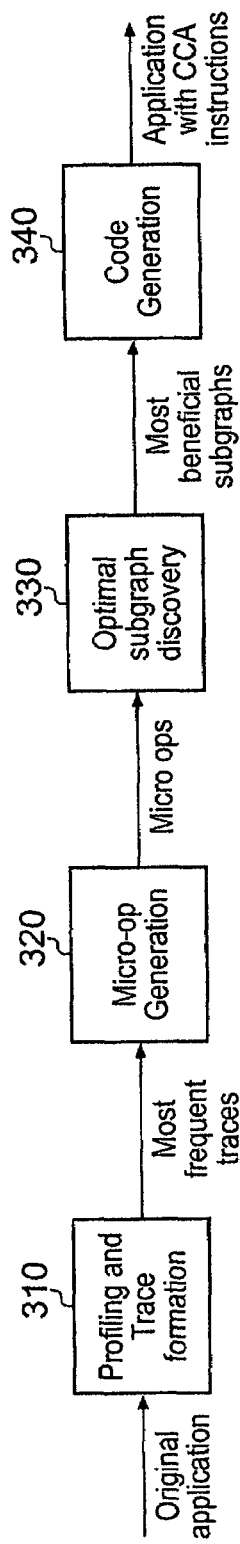
FIG. 3 schematically illustrates a work for subgraph identification.

FIG. 3 schematically illustrates a workflow for subgraph identification at the program compilation stage and the subsequent generation of micro-operations (corresponding to stage 220 of FIG. 2). The workflow starts at a stage 310 where profiling and trace formation is performed on the program code 140, which is received as input to this stage. A trace is a sequence of basic blocks that are highly likely to be executed sequentially. A basic block usually starts at an instruction that is a target of one or more branch instructions and is usually terminated by a branch instruction or a predetermined limit on block size. Traces are identified by profiling the program code 140 on sample input data. The profiling and trace formation stage 310 outputs data corresponding to the most frequently executed traces and supplies it to a micro-operation generation stage 320. This stage 320 is optional since it is required only for a certain subset of microarchitectures such as, for example, the microarchitecture of the x86 instruction set. In order to identify subgraphs of program code that can be replaced at runtime, the compiler is operable to convert its internal representation of the program code into a representation that reflects the run-time instruction stream. For the x86 instruction set the instructions are converted to micro-operations (or "uops") for dynamic execution. The majority of x86 instructions translate to a single uop although some x86 instructions do translate into a plurality of uops. Thus, at stage 320 the compiler generates uops from the program instructions of the traces and also stores a mapping between instructions and their respective uops to enable code generation at a final stage 340 of the workflow.

The micro-operation generation stage 320 supplies uops as input to an optimal subgraph discovery stage 330. The tasks performed at this stage comprise two logically distinct phases: (i) candidate subgraph enumeration, which involves enumerating all subgraphs that could potentially be selected for execution by the accelerator 120 as combined instructions; and (ii) candidate subgraph selection, which involves selection of a subset of the enumerated subgraphs for execution by the accelerator. The selection is performed by implementing a numerical weighting to increase the likelihood that subgraphs on critical paths of the program code will be selected for acceleration in preference to those subgraphs on non-critical paths. Data representing the selected subgraphs is passed from stage 330 to a code generation stage 340.

At the code generation stage 340, the compiler generates machine code corresponding to the program code 140. Since, in this particular arrangement, the uops corresponding to the subgraphs selected at stage 330 will be dynamically replaced by combined instructions at runtime, the compiler facilitates this process by inserting marker instructions into the complete uop code sequence corresponding to the translated program code 140 to mark uops associated with the selected subgraphs. The insertion of marker instructions into the executable program code does not preclude the execution of that code on a data processor not having an accelerator since in this case the marker instructions can readily be converted into null operations (NOPs). At the code generation stage 340, the mapping information (between x86 instructions and uops) that was stored at stage 320 is utilized. In particular for each selected subgraph of uop code, the corresponding x86 instructions are grouped together and the instructions thus assembled are topologically sorted based on the structure of the subgraph and placed sequentially in memory.

Figure 4:
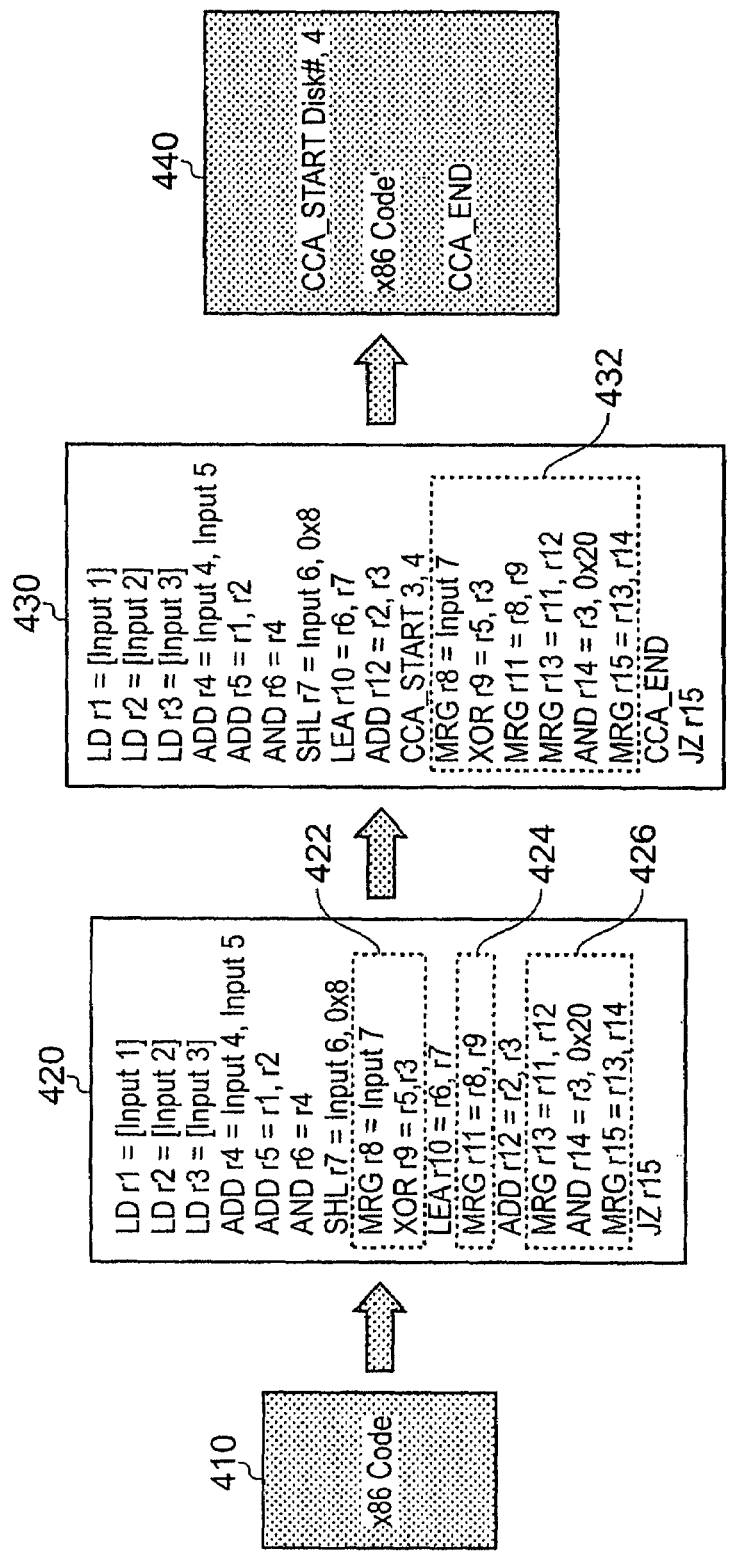
FIG. 4 schematically illustrates the code generation stage of the arrangement of FIG. 3.

The code generation stage 340 is illustrated in more detail in FIG. 4. FIG. 4 shows a block of x86 instructions 410, which is converted to a block 420 of uops (micro-operations). The six uops surrounded by dashed boxes 422, 424, 426 in block 420 are those uops corresponding to the subgraphs selected at stage 330 of FIG. 3. Note that the uops of the subgraph do not represent a contiguous block of uops in this case. The next stage of the process is shown in block 430 where the subgraph uops of block 420 have been grouped into a contiguous block 432 and they have been topologically sorted. Furthermore marker instructions CCA_ START and CCA_END have been inserted to identify the block of uops of the subgraph to be executed by the accelerator 120. Finally, the sequence of uops is translated back to x86 instructions represented by block 440 to produce x86 program instruction code augmented by the marker instructions. This augmented code is used during dynamic replacement of the subgraph code for execution by the accelerator 120.

Figure 5B:
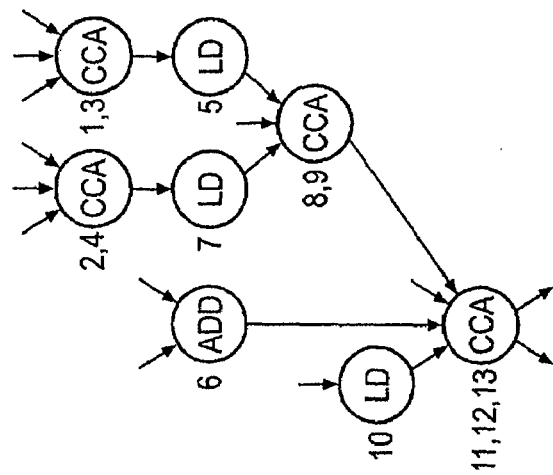
FIG. 5B schematically illustrates a portion of program data flow graph shown in FIG. 5A after subgraph replacement.
Figure 5A:
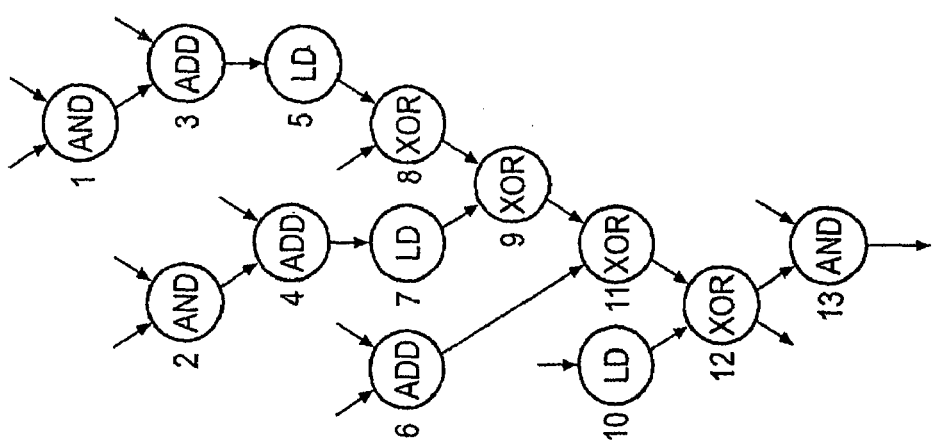
FIG. 5A schematically illustrates a data flow graph for a portion of a program application.

FIG. 5A schematically illustrates a data flow graph for a portion of a program application. FIG. 5B shows schematically illustrates the same portion of the program data flow graph of FIG. 5A but after certain subgraphs have been replaced by combined operations. FIG. 5A shows a sequence of thirteen numbered operations such as logical AND operations, exclusive OR (XOR) operations and loads (LD). A subgraph discovery algorithm operates (dynamically) on the dataflow graph of FIG. 5A, starting from the last operation in the sequence, i.e. operation 13 and seeks a match with operations in the sequence having lower numbers. The match takes into account the architectural constraints of the accelerator 120. In particular the constraints that are taken into account are:

the number of inputs/outputs of the accelerator;
illegal opcodes i.e. opcodes that cannot be mapped onto functional units of the accelerator;
subgraph outputs cannot feed subgraph inputs (this constraint serves to avoid deadlock);
the operation's "slack" i.e. how critical that operation is to the total dependence height of the data flow graph.

It can be seen from FIG. 5D that operations 11, 12 and 13 have been grouped into a first subgraph, operations 8 and 9 into a second subgraph, operations 2 and 4 into a third subgraph and operations 1 and 3 into a fourth subgraph. With regard to the first subgraph, it is apparent that in addition to operations 12 and 13, either operation 10 or operation 11 could have been added to the first subgraph. However, since operation 10 was determined to have slack of five which is greater than the slack of zero associated with operation 11 operation 11 was added to the first subgraph in preference to operation 10. Furthermore, although operation 9 could, in principle, have been added to the group of operations forming the first subgraph, this option was ruled out by the input/output constraints since a subgraph comprising operations 9, 11, 12 and 13 would require five inputs whereas the accelerator of this example embodiment is configured to accept only up to four inputs. Thus node 9 is discarded from the first subgraph and its parent operations are ignored. A similar process is used to construct the second, third and fourth subgraphs. As shown in FIG. 5B, the four subgraphs are selected for execution as respective combined operations by the accelerator 120. The configuration data 150 specifies how each of the four combined operations is to be mapped onto the matrix of functional units of the accelerator 120.

FIG. 6A schematically illustrates one way of indicating to the accelerator which portions of program code are to be accelerated. In this example separate program instructions 1, 2, 3, 7, 8 and 9 are individually executed by the execution unit 110 whereas the three separate program instructions 4, 5 and 6 together form a computational subgraph that will be executed as a combined operation by the accelerator 120. The portion of program code to be accelerated is marked by the special-purpose CCA_START instruction and a CCA_END instruction so that the execution path jumps from the execution unit 110 for instruction 3 to the accelerator 120 when the CCA_START instruction is encountered and returns to the execution unit 110 when the CCA_END instruction is encountered for individual execution of the instructions 7, 8 and 9. In the example of FIG. 6A, the subgraphs to be accelerated are stored inline in the program code. Retaining the original subgraph inline in the program code facilitates execution of the code as individually executed separate program instructions by data processing systems not having an accelerator 120. When the code of FIG. 6A is executed by a pipelined data processor having an accelerator, the presence of the subgraph to be accelerated inline in the program code may, in some cases, cause problems with the fetch stage of the pipeline such as a pipeline bubble. This can arise due to the fact that the processor must jump from individual execution of the last separate program instruction before the CCA_START instruction, i.e., instruction 3 to individual execution of the first separate program instruction following the CCA_END instruction, i.e. instruction 7. The accelerator performs the processing operations between the CCA_START and CCA_END. To prevent the occurrence of a pipeline bubble the following methods can be used in different arrangements according to the present technique:

(i) rewriting of the program code in a trace cache;
(ii) outlining of the subgraph code to be accelerated into a function (see description of FIG. 6B below) and using a branch predictor to hold the configuration data for the accelerator and to predict that such an accelerator configuration exists and hence the function call is not required (as described in relation to FIG. 13 above);
(iii) using a branch prediction scheme to spot the CCA_START instruction at the fetch stage of the pipeline and to use this to determine that a suitable accelerator configuration exists for that subgraph and to initiate fetches from the instruction after the subgraph to be accelerated (instruction 7 in this case).

Returning now to FIG. 2, at stage 230 the accelerator 120 is configured such that it is specifically tailored for execution of combined instructions corresponding to the selected subgraphs. The accelerator is configured using configuration data 150. The accelerator 120 is arranged as a matrix of functional units. This matrix structure allows for the sequential propagation of data between functional units and enables any parallelism in the computational subgraphs selected for acceleration to be exploited.

The configuration overhead is considerably reduced relative to known acceleration techniques, such as FPGAs, by sacrificing some generality yet retaining sufficient flexibility by selecting a few "computational primitives", such as add, subtract and shift, from which to construct an accelerator functional unit matrix. The computational primitives represent frequently occurring operations in dataflow graphs of computer programs. The use of small number of computational primitives reduces both the time required for reconfiguration of the accelerator and the volume of configuration data required to set up the accelerator.

The number of rows and number of columns of functional units forming the matrix of the accelerator 120 can be appropriately selected at the design stage according to the program applications to be executed. The accelerator 120 can be characterized according to three parameters: depth, width and operation capabilities. The depth is the length of the longest column of functional units whereas the width is the number of functional units that can calculate in parallel. The operation capabilities are the particular set of computational primitives that can bemapped onto a functional unit of the accelerator. With regard to the accelerator depth, there is a tradeoff between the ability to implement the largest possible number of subgraphs in a program application and the increased latency that is incurred by increasing the depth. With regard to accelerator depth, the characteristics of computer program subgraphs for the programs to be executed will have computational subgraphs having a range of widths. The relative frequencies of subgraphs having different widths at each depth level can be used to determine the most efficient configuration of functional units. A triangular configuration with the largest width at the lowest depth has been found to be particularly efficient. With regard to the operation capabilities, Table 1 below shows the relative of a number of different operations in a set of the most common subgraphs for a benchmark group of applications. It is apparent from Table 1 that the most frequently appearing operations are logical additions, logical AND operations, move operations and sign extensions. Such frequency data can be used to select the computational primitives that are mapped onto the functional units of the accelerator. Due to latency considerations, it may be efficient to exclude certain operations from the accelerator, for example, multiply/divide operations, memory operations and load operations are excluded in the present arrangement. To support load operations, in alternative arrangements stall circuitry can be incorporated in the accelerator to accommodate non-uniform latencies due to cache effects. However, since this make integration of the accelerator into the processor more difficult, the stall circuitry is not incorporated in the present arrangement.

Table 1 shows that 48.3% of operations involve either only wires (e.g. SEXT and MOV) or a single logic level (e.g. AND and OR) whilst a further 33.9% of operations (e.g. ADD, SUB, CMP) can be handled by an adder/subtracter. Thus, an adder/subtracter and wire/logic functional units are a good choice of computational primitives to be supported by the accelerator. Shifters are excluded as computational primitives in this particular arrangement since barrel shifters are too large and incur significant delays, although efficient barrel shifter implementations (e.g. full custom rather than synthesised) do exist and could be included. However, it will be appreciated that a different subset of computational primitives could be selected in a different arrangement whilst still representing an embodiment of the present technique.

TABLE 1

| Uop | Opcode Semantics | Relative Frequency in common subgraphs |
|---|---|---|
| ADD | Addition | 28.69 |
| AND | Logical AND | 12.51 |
| CMP | Comparison | 0.38 |
| LSL | Logical left shift | 9.81 |
| LSR | Logical right shift | 2.37 |
| MOV | Move | 11.66 |
| OR | Logical OR | 8.66 |
| SEXT | Sign extension | 10.38 |
| SUB | Subtract | 4.82 |
| XOR | Logical exclusive OR | 5.09 |

Figure 14A:
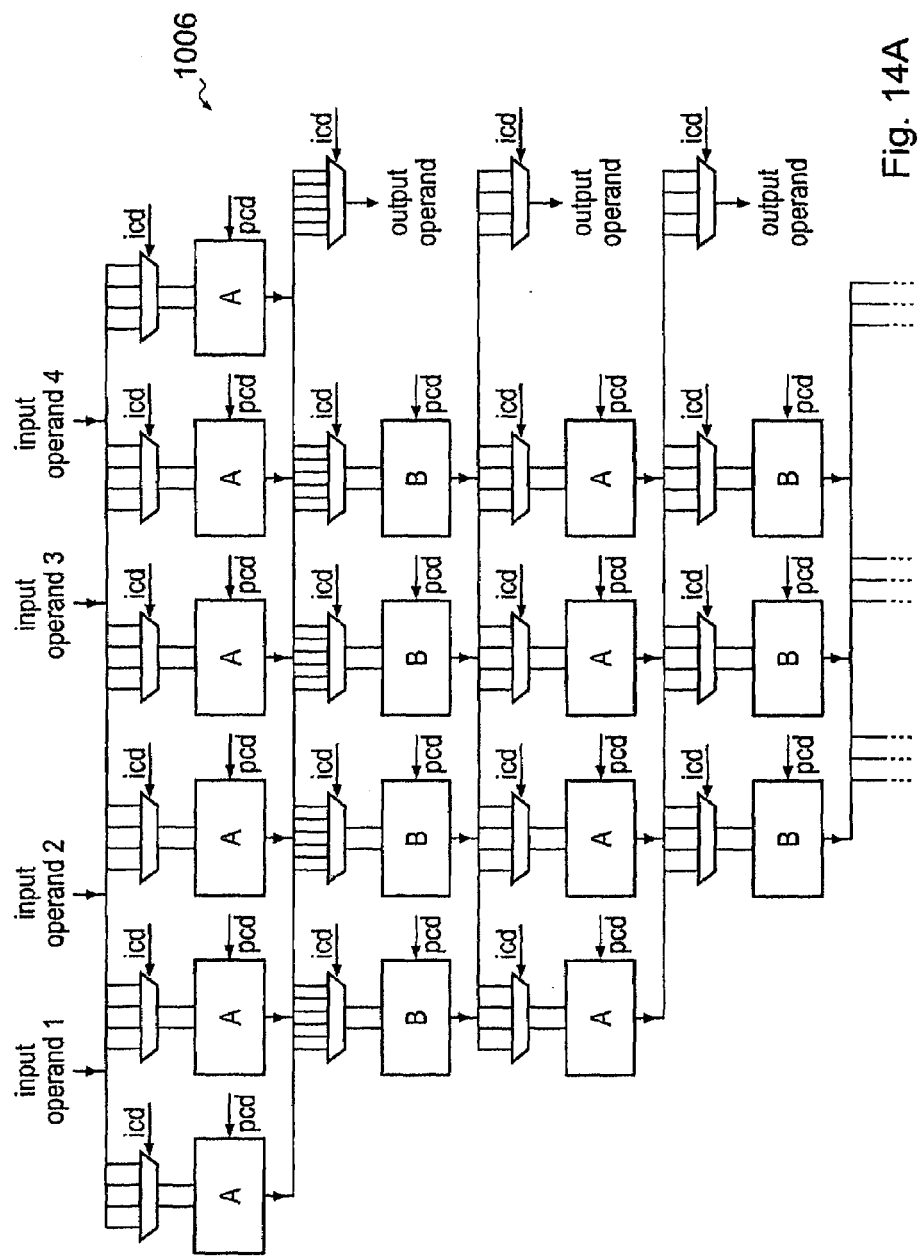
FIGS. 14A and 14B together illustrate an accelerator unit.
Figure 14B:
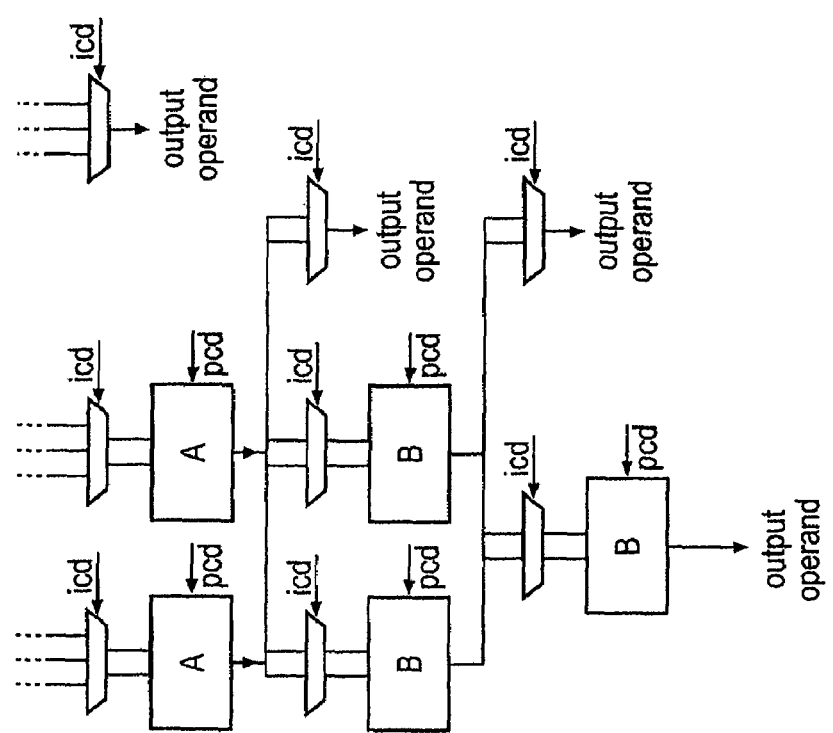

FIGS. 14A and 14B (as described above) together illustrate an accelerator matrix according to the present technique. In that particular arrangement alternate rows of functional units perform 32-bit addition/subtraction and logical operations whereas the intervening rows of functional units perform only logical operations, which include AND, OR, XOR, NOT, SEXT, MOV and bit extraction. The accelerator 120 has a depth of seven and has four inputs and two outputs. Any of the four inputs of FIG. 14A can drive the six functional units in the first depth level and the outputs of each level are fully connected to the inputs of the functional units of the next level. Each functional unit of the accelerator array has four opcode bits that define its functionality. Furthermore signals to control the bus that connects outputs of one level to one or more of the inputs of the next level are required. The number of bus control signals corresponds to twice the number of functional units in the next level since there are two output ports for each functional unit and each output could feed each input of functional units in the next level. Control bits are also used to specify which functional unit provides the second output. The total number of control bits (i.e. configuration data) used for the arrangement of FIGS. 14A and 14B is two hundred and forty-five bits.

The execution unit 110 is a pipelined data processor and the accelerator 120, which comprises the matrix of functional units, is readily integrated into the execution unit pipeline. The datapath overhead associated with the integration of the accelerator 120 with the execution unit 110 is for additional steering logic from reservation stations and bypass paths from accelerator 120 outputs. In the particular arrangement of FIG. 1, the accelerator 120 itself is not pipelined. This simplifies the construction, since in arrangements where the accelerator 120 is actually pipelined the matrix of functional units shown in FIGS. 14A and 14B comprises latches and intermediate results corresponding to internal portions of the matrix are in fact forwarded. Use of a non-pipelined accelerator in the present arrangement thus simplifies the integration of the accelerator 120 with the execution unit 110.

As mentioned above the accelerator of FIGS. 14A and 14B has four inputs and two outputs. Thus, in this example arrangement, a four input, two output instruction will have to be accommodated into the execution unit 110 pipeline. This is accomplished by splitting each accelerator operation into two uops, each having two inputs and one output. By consecutively supplying the to uops to the accelerator, the desired four input and two output instruction can be executed without altering register renaming, reservation stations, re-order buffering or any register read stage of the pipeline. However, the scheduling logic is appropriately adapted to guide two uops to the accelerator.

To avoid the possibility of an external interrupt causing only half of the two uop instruction execution to be committed, the data processing apparatus is configured to commit the two uops atomically. The configuration data 150 is communicated along with the two uops and since there is a total of two-hundred and forty-five bits of configuration data, each of the two uops carries around one-hundred and thirty bits of configuration data. In this arrangement, the operand mapping data 160 is specified as an opcode of the special-purpose accelerator instruction CCA_START (see FIG. 4) and the subsequent description of FIG. 6A. The configuration data 150 can be generated dynamically, for example, during the decode stage of the pipeline. However, since generation of the configuration data at the decode stage can potentially increase latency, in this particular arrangement configuration data for the computational subgraphs selected for acceleration is generated prior to program execution (i.e. statically). This pre-generated configuration data is saved into a translation table when the program application is loaded by the execution unit 110. The CCA_START instruction has a field that holds a pointer to the translation table for the configuration data. Alternative arrangements, which rely on dynamic generation of configuration data are more appropriate for program applications having a large number of subgraphs since this avoids any constraint on the number of subgraphs used being imposed by the size of the translation table.

Returning now to the flow chart of FIG. 2, after the accelerator has been appropriately configured to execute the subgraphs selected for acceleration, finally at stage 240 the selected subgraphs are executed by the accelerator 120.

FIG. 6B schematically illustrates an alternative way of indicating to the accelerator 120 the selected portion of program code that should be subject to accelerated execution. In this case, the instructions 4, 5 and 6 which have been identified for execution as a combined operation by the accelerator are stored separately from the program instructions to be executed by the execution unit 110. In this example, a branch link instruction is used to call the accelerator to execute the subgraph formed by instructions 4, 5 and 6. The address of the start of the subgraph is specified as a target of the branch link instruction and following accelerated execution of the subgraph, the execution automatically returns to individual execution of instructions 7, 8 and 9 by the execution unit 110. Thus the computational subgraph to be executed by the accelerator is called from the program code like a subroutine. In this particular arrangement the operand mapping data is specified as an argument of the branch link instruction but in an alternative arrangement the branch link instruction has an argument that provides an index to a look-up table that specifies the operand mapping data. Another possibility is that an ordinary branch is used and the hardware records the register mapping and stores this in an internal (non-architectural) structure for later reference.

FIGS. 7A and 7B schematically illustrate how configuration data can be re-used for the acceleration of two different subgraphs. FIG. 7A shows a first sequence of operations comprising: (i) an addition that reads input values from registers r1 and r0 and writes an output value to register r2; (ii) a logical AND operation that reads input values from registers r2 and r3 and writes an output value to register r2; and (iii) a subtraction operation that reads input values from registers r2 and r4 and writes an output value to register r5.

FIG. 7B shows a first sequence of operations comprising: (i) an addition that reads input values from registers r7 and r9 and writes an output value to register r4; (ii) a logical AND operation that reads input values from registers r4 and r5 and writes an output value to register r4; and (iii) a subtraction operation that reads input values from registers r4 and r10 and writes an output value to register r4.

The present technique recognizes that by separately specifying operand mapping data and configuration data, the configuration data can be re-used for different subgraphs. In the particular example of FIG. 7, the subgraphs corresponding to both the first sequence and the second sequence involve an ADD followed by a logical AND followed by a subtraction SUB, the only difference being in the registers specified from which to read data and to which to write data at each stage. The specification of different register numbers for the first and second sequences may be difficult to avoid due to compiler register allocation restrictions. However, in some arrangements the register allocation of the compiler can be steered to promote allocation of the same registers for the same subgraph sequences.

For the sequences of FIGS. 7A and 7B, despite the differences between the first sequence and the second sequence in the registers specified, once a configuration corresponding to an ADD, AND and SUB has been specified for the first sequence, it can be re-used for execution of the second sequence. The differences between registers used during the computations is accommodated by specifying both the registers required for inputs to the combined operation and the register associated with the final output when calling the appropriate configuration data. Thus, as shown in FIG. 7A, configuration data CCA3 is called to set up the accelerator to execute the subgraph and input operands r0, r1, r3 and r4 are specified along with the final output operand r5. Note that the register r2 is not specified since it is associated with storage of intermediate results of the combined operation, which in practice are simply passed from one accelerator matrix level to the next, rather than actually being stored in the specified register.

Similarly, as shown in FIG. 7B, configuration data CCA3 is called to set up the accelerator to execute the three operations of the sequence and registers r9, r7,r5 and r10 are specified as sources of input operands whereas r4 is specified for the final output value of the subgraph. Note that r4 is not specified as an input operand since it holds only intermediate results of the computation. Although in this example register values have been specified for storage of input and output values, in alternative arrangements operand stack positions could instead be specified for applications that use stack-based operand storage. Furthermore, rather than specifying the input and output register values of the operand mapping data inline as a field of a configuration instruction CCA3, a marker instruction such as CCA3 could have a field for specifying a pointer to the operand mapping data and/or a field for specifying a pointer to the configuration data.

Figure 8:
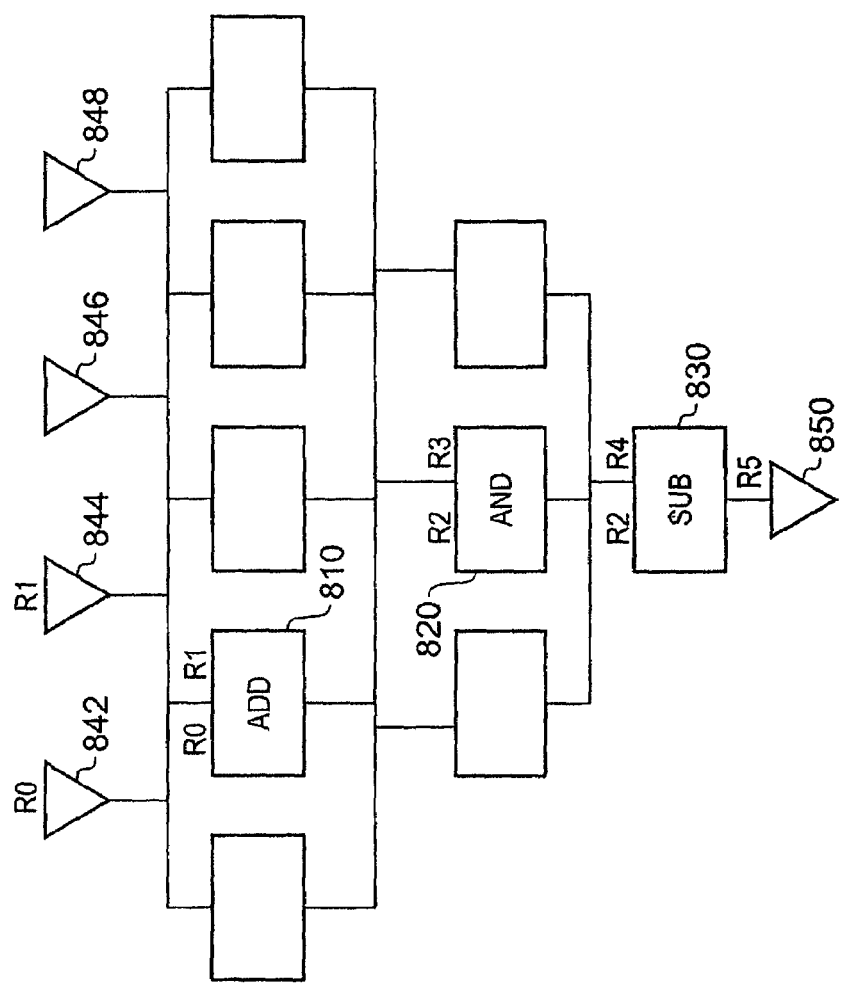
FIG. 8 schematically illustrates how operations corresponding to the sequence of FIG. 7A are marked onto the accelerator matrix.

FIG. 8 schematically illustrates how the operations of the first sequence of FIG. 7A are mapped onto the matrix of functional units of the accelerator. The accelerator in this example arrangement has four inputs, a single output and three depth levels of functional units. The ADD operation is mapped to a functional unit 810 of the first level, the AND operation is mapped onto a functional unit 820 of the second level and the SUB operation is mapped onto a functional unit 830 of the third level. The four inputs to the first level are 842, 844, 846 and 848 and two of these inputs are used to feed values from r0 and r1 to the first-level functional unit

810. Some configuration-data is required to ensure that the bus delivers both of these inputs to the correct functional unit. Further configuration data specifies that the output of the AND operation should be supplied as an input to the second-level functional unit 820. The second input operand for this stage i.e. r3 is fed in through one of the inputs to the first level. The output of the logical AND performed by functional unit 820 is supplied as one input to the third-level functional unit 830, which is configured to perform a subtraction. The second input to the subtraction is a value read from r4, which is also supplied via one of the first-level inputs 842, 844, 846, 848. The final result of the subgraph operation emerges from output terminal 850 and in this case will be written to register r5.

FIG. 9 schematically illustrates "SPILL" and "FILL" instructions that can be used to enable program code in which selected subgraphs have been marked for execution by the accelerator to be executed by data processors that do not comprise an accelerator. FIG. 9 shows subgraph code comprising a first ADD instruction, a subtract (SUB) instruction and a second ADD instruction. The first ADD instruction reads values from r6 and r7 and writes the resut of the addition to r5. The SUB instruction reads the values associated with r5 and r6 as inputs and associates the output of the subtraction with r7. The second ADD operation reads values associated with r7 and r6 as inputs and outputs the final result to r5. Since in this accelerated subgraph, the register r7 is used as an input value for the first operation but is only used as an internal register value thereafter, the register r7 can be re-allocated by the accelerator after the input value from the first addition operation has been read from it. This is because for subsequent stages of the combined operation no result values need actually be written to or read from r7. This enables more efficient use of limited register resources in the data processing system employing the accelerator. However, backwards compatibility with data processors not having an accelerator according to the present technique is ensured by introducing a SPILL instruction after the first ADD instruction to store the contents of r7 to memory and a fill instruction between the SUB instruction and the second ADD instruction to retrieve the stored value from memory. Thus the SPILL and FILL instructions are analogous to a stack push and a stack pop respectively.

Figure 10:
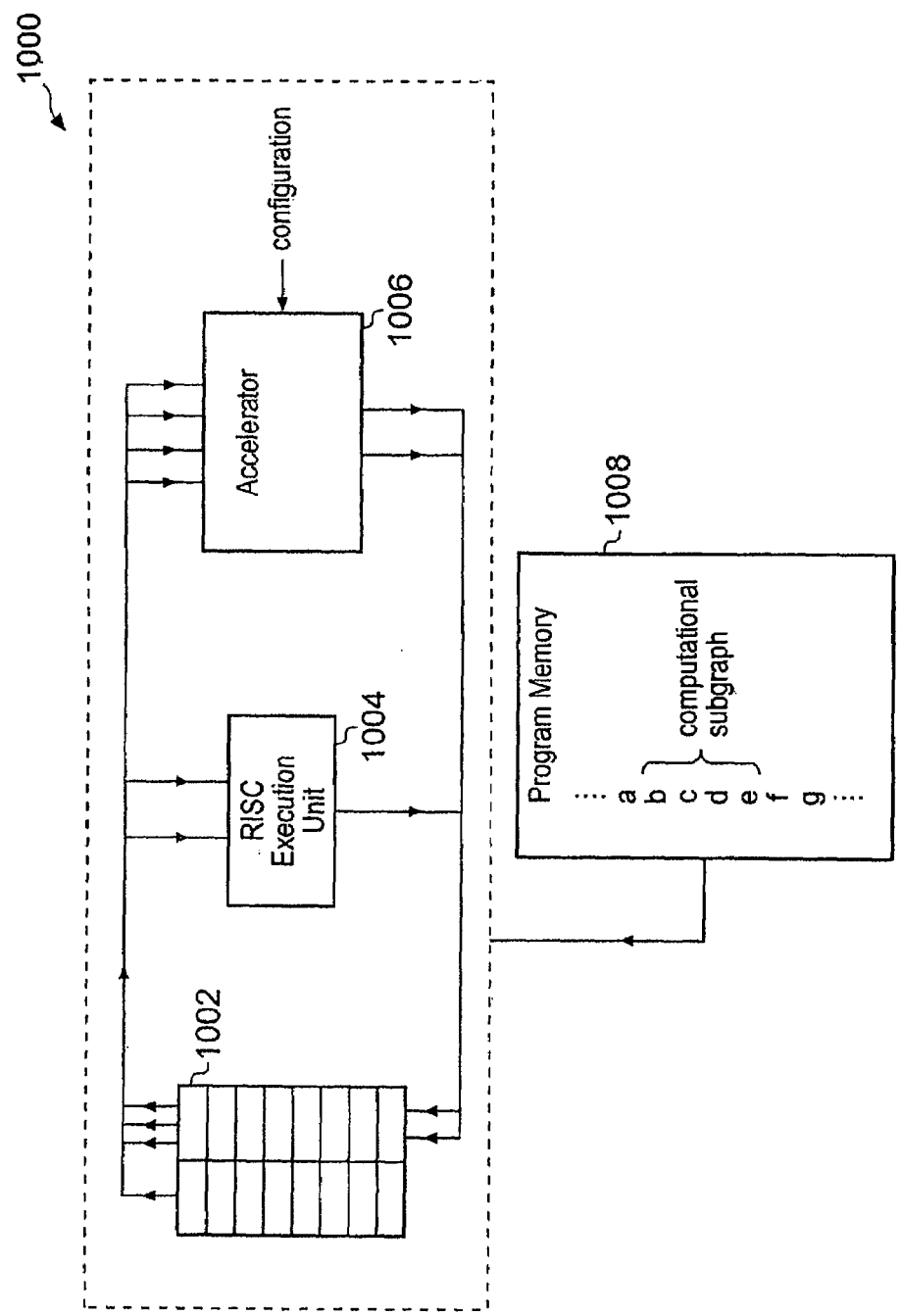
FIG. 10 schematically illustrates a data processing system including an accelerator unit for accelerating computational subgraphs within a program.

FIG. 10 shows a data processing system 1000 including an operand store in the form of a register file 1002. The register file 1002 provides input operands to a normal RISC execution unit 1004 as well as to an accelerator unit 1006. Result operands from the execution unit 1004 and the accelerator unit 1006 are written back into the register file 1002. The data processing system 1000 operates under control of a program stored within a program memory 1008. This program includes computational subgraphs (e.g. the instructions a, c, d and e) which may be subject to accelerated execution by the acceleration unit 1006. The acceleration unit 1006 is configurable under control of applied configuration data such that a wide variety of different forms of computational subgraph may be accelerated depending upon the applied configuration.

The normal execution unit 1004 in this example has two read ports from the register file 1002 and one write port to the register file 1002. In contrast, the accelerator unit 1006, which is typically performing more complex operations than the normal execution unit 1004, requires more input operands and output operands. Thus, the register file 1002 is provided with four read ports and two write ports. This has been found to match many real life computational subgraphs which are desired to be subject to acceleration by an acceleration unit 1006 as illustrated. The additional read and write ports for the register file 1002 impose additional circuit overhead, but this is adequately compensated by the increased execution speed of the acceleration unit 1006.

The program within the program memory 1008 still contains the individual separate program instructions capable of execution by the execution unit 1004 which together form the computational subgraph which is to be subject to acceleration by the acceleration unit 1006. Thus, the program stored within the program memory 1008 is capable of execution upon a system which does not include the acceleration unit 1006.

FIGS. 11A to 11F illustrate different forms of subgraph suggestion data which may be added to or associated with the program to identify computational subgraphs which may be subject to acceleration by the acceleration unit 1006.

Figures 11A, 11B:
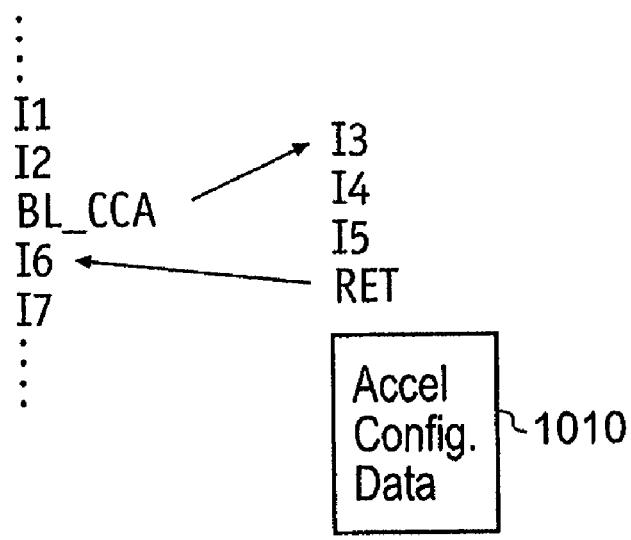
FIGS. 11A to 11F schematically, illustrate different example forms of subgraph suggestion data.

In FIG. 11A the computational subgraph to be accelerated is instructions I3, I4 and I5. This computational subgraph is delimited by a CCA_Start instruction and a CCA_Stop instruction. These instructions can be added to the instruction set of the data processing system 1000. These instructions can be ignored by systems which do not include an accelerator unit 1006 and instead the normal instructions I3, I4 and I5 will be executed by the execution unit 1004. However, if an acceleration unit 1006 is present, then the CCA_Start instruction and the CCA_Stop instruction are used to identify a computational subgraph of instructions which can be accelerated by the acceleration unit 1006. In this circumstance for this example, the normal execution unit 1004 will not execute the instructions I3, I4 and I5, but instead the configurable accelerator 1006 will perform an accelerated execution of these instructions. (As an alternative the subgraph when first encountered may not be accelerated as suitable configuration data for the accelerator does not at that stage exist.) This accelerated execution may take a single computational cycle or multiple computational cycles but will typically be more rapid than the separate individual execution of the different instructions that form the computational subgraph. The CCA_Start instruction is a sequence start marker instruction and the CCA_Stop instruction is a sequence end marker instruction.

FIG. 11B illustrates an alternative form of subgraph suggestion data. In this example the same computational subgraph I3, I4 and I5 is outlined into a subroutine terminated by a return instruction RET. This subroutine is branched to using a subgraph branch instruction BL_CCA which indicates a branch to a sequence of instructions which are a computational subgraph that can be subject to an acceleration by an acceleration unit 1006, if such an acceleration unit 1006 is present. The subgraph branch instruction illustrated may be a branch and link instruction in which the return address is automatically saved as part of the branch, but alternatively different forms of instructions which trigger non-sequential program flow may also be used with such outlined subroutines corresponding to computational subgraphs. In the example of FIG. 11B accelerator unit configuration data 1010 is appended to the end of the computational subgraph subroutine. This is one example of how the accelerator unit configuration data may be associated with or embedded within the computer program to which it relates.

Figures 11C, 11D:
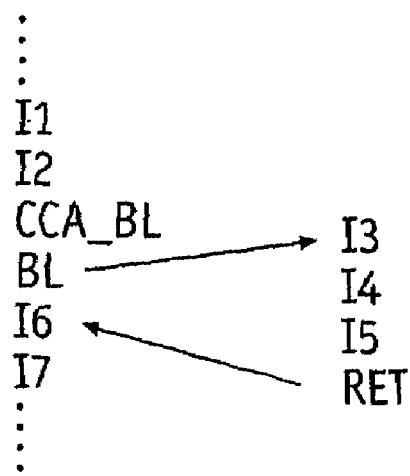

FIG. 11C illustrates an example of a branch marker instruction being used as subgraph identifying data. FIG. 11C illustrates a standard branch and link instruction BL which is predicated with a branch marker instruction CCA_BL. This branch marker instruction indicates to the system that the following branch instructions is to a subroutine which corresponds to a computational subgraph which may be accelerated by an acceleration unit 1006 if this is present. The CCA_BL instruction can be ignored by an embodiment which does not include an appropriate accelerator unit 1006. If an exception/interrupt occurs between the CCA_BL and the BL, then various options exist. The CCA_BL hint could be discarded and the subgraph executed without acceleration upon return. The CCA_BL and BL could be fused in execution such that exceptions cannot occur between them or the return could be fixed to return to a BL_CAA rather than a BC. In a similar way, the subgraph branch instruction BL_CCA of FIG. 11B can be interpreted as a standard form of branch and link instruction if the accelerator unit 1006 is not present.

FIG. 11D indicates a sequence marker instruction CCA_len#3 embedded within the program indicating the start of a computational subgraph and the length of that subgraph. In this example, the computational subgraph is the same three separate individual program instructions I3, I4 and I5. The sequence marker instruction immediately precedes this sequence of separate instructions and specifies that their length is three instructions.

Figures 11E, 11F:
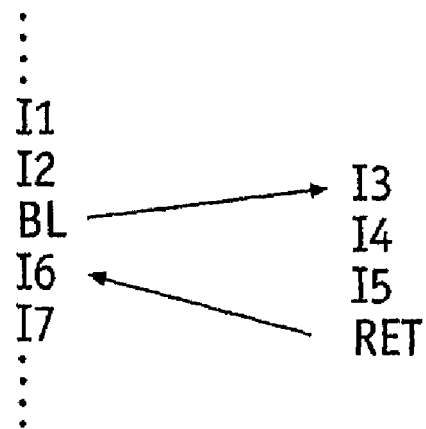

FIG. 11E illustrates another type of operation. In this embodiment a compiler which forms the program to be executed outlines (i.e. rearranges the code as to form suitable subroutines corresponding to the subgraph) computational subgraphs capable of execution within embodiments having an accelerator unit 106 into short subroutines. These subroutines are below a predetermined length and the system makes an assumption that such short subroutines are capable of acceleration by an accelerator unit 1006 if they are encountered (e.g. use of implicit markers). Whilst this assumption might not be universally correct, the system can revert to the normal execution of the individual programs if it turns out that the accelerator is not capable of accelerating that computational subgraph. Some time may be wasted in attempting such an acceleration and it failing, but overall the system can gain performance by use of this technique. The compiler can be arranged to compile code so as to avoid short subroutines unless they are computational subgraphs capable of acceleration by the optionally present accelerator unit 1006. Another possibility is that all subroutine calls of whatever length may be assumed to be capable of acceleration with normal execution being reverted to if acceleration is not in fact supported for a particular subroutine.

If the system does not explicitly mark subgraphs, then indicating which are the liveout registers becomes more difficult as there is no instruction operand in which to do so. With a CCA start instruction, one of the operands can specify the internal liveout register (as the last destination was assumed liveout). However, with an implicit marker, there is not opportunity to name an internal liveout. One solution is to assume that the accelerator supports k liveouts then the destinations of the last k instructions may be assumed liveout; identification is then straight forward. The compiler can reorder the subgraph instructions to put the liveout producing instructions in the last k positions of the order, while still maintaining correct sequential semantics. Two subcases result, either this can be done without violating correctness by simple code reordering or it cannot. If it can, the compiler can proceed in this way and the problem is solved. If it cannot, then an additional, "useless" move can be inserted into the outlined body of the form liveout=liveout. This instruction will not do anything, but it will serve to mark the register as liveout as it will appear in the last k instructions of the sequence.

FIG. 11F illustrates another example of subgraph identifying data. In this example the computational subgraph is compiled into a characteristic form of instructions I3', I4' and I5'. These are chosen to be atypical forms of the instructions concerned and can be pattern matched by the hardware to identify computational subgraphs for acceleration by an acceleration unit 1006 when present. These pattern matched forms thus serve as the hint data. The compiler can be controlled to avoid generating such characteristic instructions when they do not correspond to a computational subgraph which may be subject to acceleration.

Figure 12A:
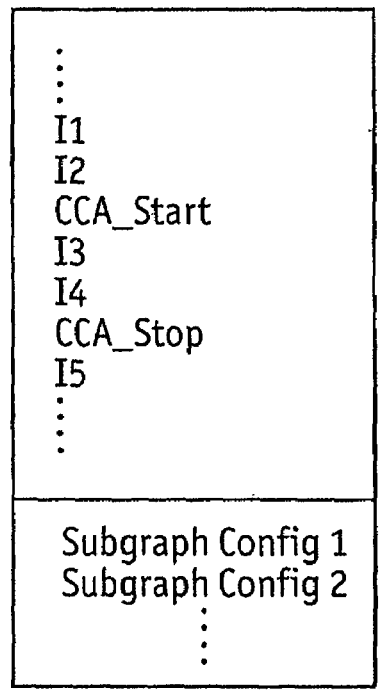
FIGS. 12A and 12B schematically illustrate the addition of accelerator configuration data to a program.

FIG. 12A illustrates a first example of associating accelerator configuration data with a program. In this example the subgraph configuration data is appended to the main program. This subgraph configuration data can be read from this point into a special purpose configuration data memory on system initialisation/boot or at another time. The appended configuration data can be considered as a table of configurations that are applied to a general purpose accelerator unit 1006 to configure it to accelerate predetermined computational subgraphs.

Figure 12B:
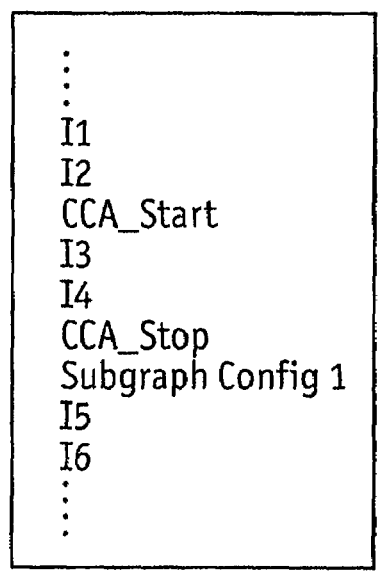

FIG. 12B illustrates another example of the way in which configuration data may be combined with the computer program. In this example the subgraph configuration data is embedded within the program itself following a particular computational subgraph to which it relates. On a legacy system which did not include an accelerator unit 1006, the CCA_Stop instruction would need to be supported to the extent that the sequence of data corresponding to the configuration data following that subgraph suggestion instruction was skipped rather than any attempt made to execute what was in fact configuration data rather than program code. Such behavior can be provided by an appropriate undefined exception handler rather than requiring hardware modification on a legacy system.

Figure 13:
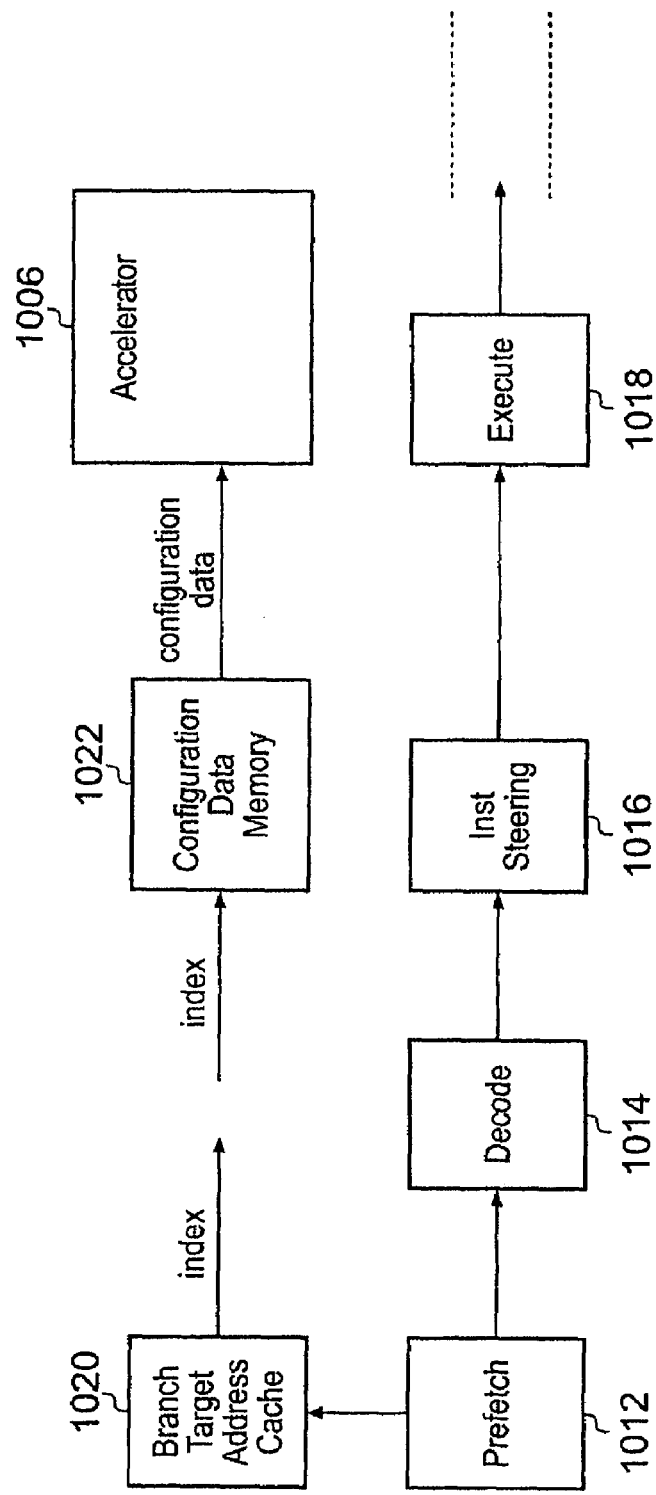
FIG. 13 schematically illustrates an instruction pipeline including a branch target address cache which is operable to setup the configuration of an accelerator unit.

FIG. 13 illustrates an instruction pipeline modified to support subgraph acceleration with a configurable acceleration unit 1006. A portion of the standard pipeline including a prefetch unit 1012, a decode unit 1014, an instruction steering unit 1016 and an execute unit 1018 is illustrated. It will be appreciated that further pipeline stages may also be provided and that some of these functional stages may be split depending upon the design parameters chosen.

Alongside the prefetch unit 1012, there is provided a branch target address cache 1020. As is known within the field, branch target address caches 1020 serve to cache the target addresses associated with previously encountered branch instructions such that the prefetch unit 1012 can when required start to prefetch from the branch target working upon a prediction as to whether or not that branch will or will not be taken. Such branch target address caches 1020 can be modified to help support the configurable acceleration unit 1006 previously discussed. In particular, the special forms of branch instruction as previously discussed or the sequence start/end marker instructions previously discussed may be identified by the branch target address cache 1020 and have associated with them an index value used to index into a table of configuration data stored within a configuration data memory 1022. Alternatively, the raw configuration data may be stored within the branch target address cache itself (typical configuration data may be of the order of 256 bits or similar). Thus, when a computational subgraph is identified by the subgraph hint information embedded within the program, its configuration data can be directly or indirectly identified and passed along the pipeline until the execute stage is reached. At that stage, the instruction steering unit can steer the computational subgraph either to be executed as a combined or otherwise accelerated, operation by the accelerator unit 1006 or to be executed by the normal execution unit 1004.

FIGS. 14A and 14b together schematically illustrate a configurable accelerator unit 1006. As illustrated in this example, there are four input operands received. A single output operand emerges from the last stage within the accelerator 1006, but alternative or additional output operands (subject in this example to a maximum of two output operands) may also be tapped off from various points along the accelerator 1006. As illustrated, each stage within the accelerator is preceded by a row of multiplexers. These multiplexers each select from among the total possible number of inputs to that accelerator stage either one or two inputs to be provided to an associated primitive operating unit. Interconnect configuration data icd configures these multiplexers to make the connections required by the particular computational subgraph being accelerated.

The primitive operator units in this example have two Forms namely Form A and Form B. Form A is capable of performing arithmetic operations, such as addition and subtraction, as well as logical operations such as ANDs, Ors, shifts, bit extractions and the like. The primitive operator unit of Form B is able to perform the logical operations but not the arithmetic operations of addition and subtraction. The hardware saving of not having to provide adder support at each stage within the accelerator unit 1006 is considerable and yet many real life computational subgraphs may still be mapped onto the accelerator unit 1006. The individual primitive operator units are configured to perform the desired computational manipulation using primitive configuration data pcd applied thereto. Thus, it will be seen that a combination of the interconnect configuration data icd and the primitive configuration data pcd together configure the accelerator unit 1006 to perform a particular desired computational subgraph.

It will be appreciated that in the action of the accelerator unit 1006 the primitive operator units are each capable of producing an intermediate result value. These intermediate result values are then passed onto further primitive operator units via the interconnect units (multiplexers). These intermediate result values whilst they may correspond to register values within the computational subgraph being accelerated do not in practice need to be written to or read from such registers. Thus, finite register resources both in terms of register space and access ports to the register file need not be consumed by the accelerator unit 1006 for such intermediate result values. This can also save energy and forwarding logic requirements for such unimportant intermediate results. This extends the capability of the accelerator unit 1006 whilst still allowing it to be tightly coupled to the existing operand store (register file 1002) and normal execution unit 1004.

Figure 15:
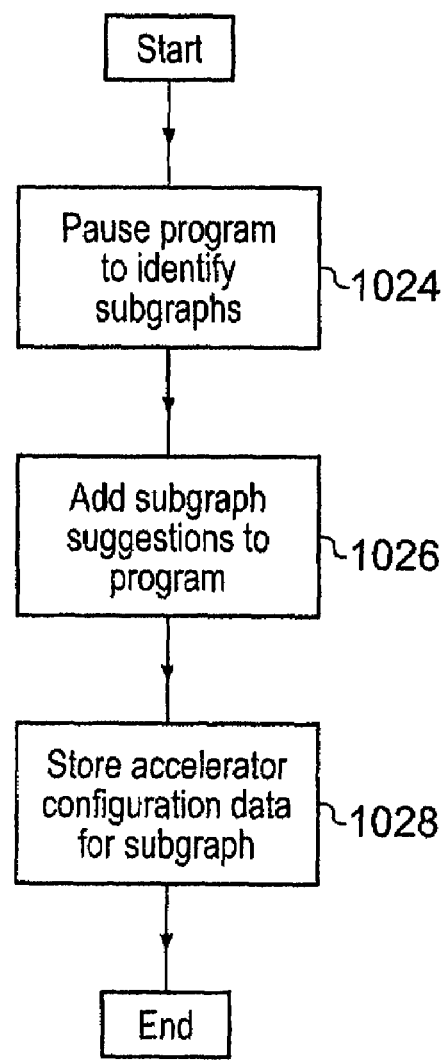
FIG. 15 is a flow diagram schematically illustrating the addition of subgraph suggestion data to a program.

FIG. 15 is a flow diagram schematically illustrating the addition of subgraph identification data to the program. This method may be performed by a software compiler as part of its compilation operation. Compilers typically already identify computational subgraphs within the programmer code they are compiling to efficiently map this onto the target processor native code. This computational subgraph identification can be extended to trigger the addition of subgraph identification data to the program code with that subgraph identification data being used by optionally present configurable accelerator units 1006 to delimit acceleratable subgraphs. Alternatively, such subgraph identification may be performed by a program thread executing upon the target processor itself and analysing its own code or in some circumstances by dedicated hardware operating on the target processor.

At step 1024, the program is parsed to identify computational subgraphs capable of acceleration. At step 1026 the subgraph suggestion data is added to the program. At step 1028 the accelerator configuration data (icd and pcd) is added to the program. This accelerator configuration data targets the computational subgraphs which have been identified by the parsing process and enables the general purpose accelerator unit 1006 to be configured to particular computational subgraphs.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. An information processor for executing a program comprising a plurality of separate program instructions:
   processing logic operable to individually execute said separate program instructions of said program;
   an operand store operable to store operand values; and
   an accelerator having an array comprising a plurality of functional units, said accelerator being operable to execute a combined operation corresponding to a computational subgraph of said separate program instructions by configuring individual ones of said plurality of functional units to perform particular processing operations associated with one or more processing stages of said combined operation;
   wherein said accelerator executes said combined operation in dependence upon operand mapping data providing a mapping between operands of said combined operation and storage locations within said operand store and in dependence upon separately specified configuration data providing a mapping between said plurality of functional units and said particular processing operations such that said configuration data can be re-used for different operand mappings.

2. An information processor according to claim 1, in which said operand store is a register file and said storage locations of said operand mapping data are register locations.

3. An information processor according to claim 1, in which said operand store is an operand stack and said storage locations of said operand mapping data are operand stack locations.

4. An information processor according to claim 1, in which said program comprises subgraph identification information for identifying said computational subgraphs to be executed by said accelerator.

5. An information processor according to claim 4, in which said computational subgraph identification information comprises a marker instruction.

6. An information processor according to claim 1, in which at least a portion of said configuration data is generated statically prior to execution of said program.

7. An information processor according to claim 1, in which at least a portion of said configuration data is dynamically generated at runtime.

8. An information processor according to claim 5, in which said marker instruction is a branch link instruction.

9. An information processor according to claim 8, in which said branch link instruction has a field for specifying a target address enabling said separate program instructions corresponding to said computational subgraph and to be executed by said accelerator to be called as a subroutine.

10. An information processor according to claim 5, in which said marker instruction has a field for specifying a pointer to said operand mapping data.

11. An information processor according to claim 5, in which said marker instruction has at least one field for inline specification of said operand mapping data.

12. An information processor according to claim 5, in which said marker instruction has a field for specifying a pointer to said configuration data.

13. An information processor according to claim 12, in which said information processor comprises a memory operable to store said configuration data and in which said accelerator is operable to access said configuration data from said memory.

14. An information processor according to claim 12, in which said information processor is operable to reconstruct said configuration data corresponding to a particular computational subgraph from both configuration data for a different computational subgraph and configuration difference data specifying differences between configuration data for said different subgraph and configuration data for said particular computational subgraph.

15. An information processor according to claim 11, in which said information processor comprises an instruction pipeline.

16. An information processor according to claim 15, in which said accelerator is non-pipelined.

17. An information processor according to claim 15, in which at least a portion of said configuration data is generated at a decode stage of said instruction pipeline.

18. An information processor according to claim 15, comprising a trace cache and in which said configuration data is generated in dependence upon information derived from said trace cache.

19. An information processor according to claim 15, in which said information processor is operable to read said configuration data from memory and to configure said accelerator between a decode pipeline stage and an execute pipeline stage.

20. An information processor according to claim 1, in which said separate program instructions are RISC instructions and said combined operation is a CISC instruction.

21. An information processor according to claim 1, in which said operand mapping data specifies data storage locations corresponding to input operands and output operands for said computational subgraph and excludes data storage locations corresponding to intermediate results of said combined operation.

22. A method of processing information under the control of a computer program comprising a plurality of separate program instructions, said method comprising:
 individually executing said separate program instructions of said program using processing logic;
 storing operand values in an operand store;
 executing a combined operation corresponding to a computational subgraph of said separate program instructions using an accelerator having an array comprising a plurality of functional units by configuring individual ones of said plurality of functional units to perform particular processing operations associated with one or more processing stages of said combined operation; and
 executing said combined operation on said accelerator in dependence upon operand mapping data providing a mapping between operands of said combined operation and storage locations within said operand store and in dependence upon separately specified configuration data providing a mapping between said plurality of functional units and said particular processing operations such that said configuration data can be re-used for different operand mappings.

23. A computer program product comprising a computer readable storage medium containing computer readable instructions that when executed are operable to compile a source code sequence comprising a plurality of separate program instructions of a computer program to form executable program instructions, said computer program comprising:
 analysis code for analysing said source code and translating said source code into a stream of executable program instructions capable of execution by processing logic within a data processing apparatus;
 identifying code for identifying candidate computational subgraphs within said stream of executable program instructions;
 subset selection code for selecting a subset of said candidate computational subgraphs for accelerated execution as respective combined operations on an accelerator having an array comprising a plurality of functional units, individual ones of said functional units being configurable to perform particular processing operations associated with one or more stages of said combined operations, said accelerator being operable to execute said combined operations in dependence upon operand mapping data providing a mapping between operands of said combined operation and storage locations within said operand store and in dependence upon separately specified configuration data; and
 configuration data generating code for generating said configuration data providing a mapping between said plurality of functional units and said particular processing operations such that said configuration data can be re-used for different operand mappings.

24. A method of compiling a source code sequence comprising a plurality of separate program instructions of a computer program to form executable program instructions, said method comprising:
 analysing said source code sequence and translating said source code sequence into a stream of executable program instructions capable of execution by processing logic within a data processing apparatus;
 identifying candidate computational subgraphs within said stream of executable program instructions;
 selecting a subset of said candidate computational subgraphs for accelerated execution as respective combined operations on an accelerator having an array comprising a plurality of functional units, individual ones of said functional units being configurable to perform particular processing operations associated with one or more stages of said combined operations, said accelerator being operable to execute said combined operations in dependence upon operand mapping data providing a mapping between operands of said combined operation and storage locations within said operand store and in dependence upon separately specified configuration data; and
 generating configuration data providing a mapping between said plurality of functional units and said particular processing operations such that said configuration data can be re-used for different operand mappings.

25. An information processor for executing a program comprising a plurality of separate program instructions:

means for processing operable to individually execute said separate program instructions of said program;
means for storing operand values; and
means for accelerating execution having an array comprising a plurality of functional units, said accelerating means being operable to execute a combined operation corresponding to a computational subgraph of said separate program instructions by configuring individual ones of said plurality of functional units to perform particular processing operations associated with one or more processing stages of said combined operation;

wherein said accelerating means executes said combined operation in dependence upon operand mapping data providing a mapping between operands of said combined operation and storage locations within said storing means and in dependence upon separately specified configuration data providing a mapping between said plurality of functional units and said particular processing operations such that said configuration data can be re-used for different operand mappings.

* * * * *